(12) United States Patent
Welcher et al.

(10) Patent No.: US 7,036,144 B2
(45) Date of Patent: Apr. 25, 2006

(54) SELECTIVE PREVENTION OF UNDESIRED COMMUNICATIONS WITHIN A COMPUTER NETWORK

(75) Inventors: Jon Ryan Welcher, 336 Sylvia St., Encinitas, CA (US) 92024; Sacha Laurent Marcroft, Huntington Beach, CA (US)

(73) Assignee: Jon Ryan Welcher, Encinitas, CA (US)

( * ) Notice: Subject to any disclaimer, the term of this patent is extended or adjusted under 35 U.S.C. 154(b) by 830 days.

(21) Appl. No.: 09/746,350

(22) Filed: Dec. 21, 2000

(65) Prior Publication Data
US 2002/0083337 A1    Jun. 27, 2002

(51) Int. Cl.
*G06F 17/00* (2006.01)
(52) U.S. Cl. .............................. 726/16; 726/34; 726/36
(58) Field of Classification Search ................ 709/219, 709/223, 224; 713/200, 201; 726/16, 34, 726/36
See application file for complete search history.

(56) References Cited

U.S. PATENT DOCUMENTS

| | | | |
|---|---|---|---|
| 5,652,575 A | 7/1997 | Pryor et al. | |
| 5,841,836 A | 11/1998 | Dunn et al. | |
| 6,009,527 A | 12/1999 | Traw et al. | |
| 6,067,346 A | 5/2000 | Akhteruzzaman et al. | |
| 6,105,134 A | 8/2000 | Pinder et al. | |
| 6,147,608 A * | 11/2000 | Thacker .................... | 340/573.1 |
| 6,421,321 B1 * | 7/2002 | Sakagawa et al. ....... | 370/238.1 |
| 6,633,905 B1 * | 10/2003 | Anderson et al. ........... | 709/219 |

OTHER PUBLICATIONS

Large campus communication center and security system integration, consolidation, and re-engineering Carback, R.T.; Security Technology, Proceedings. IEEE 31st Annual 1997 International Carnahan Conference on Oct. 15-17, 1997 Page(s):140-152.*

RAMO: management network for telecommunications environment equipment; Marquet, D.; Leblanc, J.P.; Telecommunications Energy Conference, 1993. INTELEC '93. 15th International vol. 1, Sep. 27-30, 1993 Page(s):173-177 vol. 1.*

Using explicit reservations to arbitrate access to a metropolitan system of slotted interconnected rings combining TDMA and WDMA; Linardakis et al.; Lightwave Technology, Journal of vol. 23, Issue 4, Apr. 2005 Page(s): 1576-1585.*

Unique Network Security Tools, Market Centeral, Inc., downloaded from www.mctech.com/page38.html on Oct. 30, 2000.

* cited by examiner

*Primary Examiner*—David Jung
(74) *Attorney, Agent, or Firm*—Edward W Callan (57) ABSTRACT

A system for controlling communication-access within a computer network, includes an access-prevention device connected in series with a computer's bi-directional network-communication port for preventing the computer from receiving and/or transmitting any communications from and/or to another computer within the network; and a control device for selectively controlling the access-prevention device. Such an access-prevention device including a control terminal for connection to the control device is disposed within a communication-access control apparatus that may be connected between the computer network and the computer. Alternatively, the access-prevention device is disposed within the computer chassis, the modem, an external network-access terminal or a firewall device. The control device includes a manual switch actuator disposed on a chassis containing the access-prevention device, or a remote-control device, or a computer keyboard or a mouse, or a presence detector, or an inactivity detector.

26 Claims, 4 Drawing Sheets

SELECTIVE PREVENTION OF UNDESIRED COMMUNICATIONS WITHIN A COMPUTER NETWORK

BACKGROUND OF THE INVENTION

The present invention generally pertains to communications within a computer network and is particularly directed to controlling communication-access within a computer network.

Many computers are at one time or another connected within a network including one or more other computers for communication with another computer. Such networks include local area networks, the Internet, and computers connected via Internet service providers to the Internet, among others. Many a computer is so coupled to a network by cables and/or modems that the computer is automatically connected within the network for bi-directional communication with another computer within the network whenever the computer is turned on.

There is a desire to protect the security of a network-connected computer by preventing undesired communications between the computer and other computers within the network. Various systems, such as firewalls implemented by hardware devices and/or software, are commonly used in an attempt to provide such security. However, the cost of installing such a system is more than many computer owners want to expend. Also, some firewall systems do not always prevent security breaches.

An undesired communication by a computer with another computer in a network can be detected on some occasions by a computer operator while he is at his computer station, whereupon the computer operator can terminate the detected undesired communication by turning off his computer or by unplugging the coupling of his computer to the network. Also, a computer operator can prevent any undesired communications with his computer from occurring while he is not at his computer station by turning off his computer when he leaves his computer station.

However, because of the time and procedures required to turn a computer back on after it has been turned off (reboot), it is a common practice among many computer operators to leave their computers on when they are not at their computer stations.

There are apparatus for controlling communication-access between a computer network and either a computer or a modem that has a given port for bi-directional communication by the computer or the modem with the network. One such apparatus includes an access-prevention device having a first connector for connection to the given port, a second connector for connection to the network, and switching means connected in series between the first and second connectors for preventing any network communications between the first connector and the second connector; and a manual push-button control device for controlling the switching means to prevent the first connector from receiving any network communications from the second connector and/or to prevent any network communications between the first connector and the second connector.

Another such apparatus includes an access-prevention device having a first connector for connection to the given port, a second Ethernet connector for connection to an "internal" network, a third telephone-line connector for dial-up connection to the Internet; and switching means for connecting the computer to either the internal network or the Internet; and a control device for automatically controlling the switching means of the access-prevention device to disconnect the computer from the internal network during a dial-up session on the Internet and to reconnect the computer to the internal network when the dial-up session is concluded.

SUMMARY OF THE INVENTION

The present invention provides alternative inexpensive, easily used access-prevention devices for preventing undesired communications by a given network-connected computer with another computer within the network while the given computer remains on and running.

In one aspect, the present invention provides an access-prevention device for controlling communication-access between a computer network and either a computer or a modem that has a given port for bi-directional communication by the computer or the modem with the network, the access-prevention device consisting of a first connector for connection to the given port, a second connector for connection to the network, electrically powered switching means connected in series between the first and second connectors and operable in response to a given control signal for preventing receipt by the first connector of any network communications from the second connector and/or for preventing receipt by the second connector of any network communications from the first connector, and a control terminal connected to the switching means for providing said given control signal to the switching means from an external source.

In another aspect, the present invention provides an access-prevention device for controlling communication-access between a computer network and either a computer or a modem that has a given port for hi-directional communication by the computer or the modem with the network, the access-prevention device consisting of a first connector for connection to the given port, a second connector for connection to the network, and switching means connected in series between the first and second connectors for preventing receipt by the first connector of any network communications from the second connector and/or for preventing receipt by the second connector of any network communications from the first connector.

In a further aspect, the present invention provides a combination of an access-prevention device and a control device for controlling communication-access within a computer network to a given computer that has a given port for bi-directional communication by the given computer with another computer within the network, said combination comprising: an access-prevention device connected in series with the given port for preventing the given computer from receiving and/or transmitting any communications from and/or to said another computer within the network; and a control device for controlling the access-prevention device; wherein the access-prevention device consists of a first connector for connection to the given port, a second connector for connection to the network, electrically powered switching means connected in series between the first and second connectors and operable in response to a given control signal for preventing receipt by the first connector of any network communications from the second connector and/or for preventing receipt by the second connector of any network communications from the first connector, and a control terminal connected to the switching means for providing said given control signal to the switching means from an external source; and wherein the access-prevention device is disposed within a chassis that contains the given computer.

In additional aspects, the present invention provides a combination of an access-prevention device and a control device for controlling communication-access within a computer network in which the access-prevention device is disposed within a chassis that contains a modem, a chassis that contains an external network-access terminal, or a chassis that contains an external firewall device.

Additional features of the present invention are described with reference to the detailed description of the preferred embodiments.

DETAILED DESCRIPTION

Figure 1:
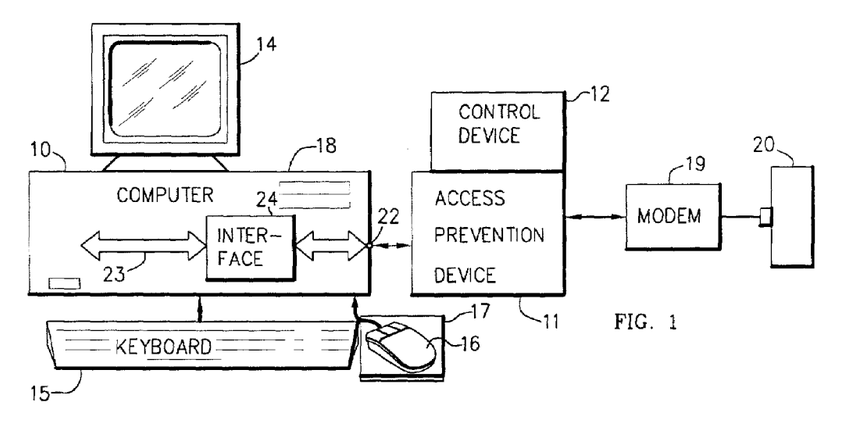
FIG. 1 is a block diagram of one preferred embodiment of a system for controlling communication-access within a computer network according to the present invention.

Referring to FIG. 1, a preferred embodiment of a system for controlling communication-access within a computer network includes a computer 10, an access-prevention device 11 and a control device 12. The computer 10 is connected to a monitor 14, a keyboard 15, and a mouse 16, which resides on a mouse pad 17. The keyboard 15 and the mouse 16 are connected to the computer for controlling operation of the computer. The computer 10 also is connected by a modem 19 to an external network-access terminal 20 for enabling bi-directional communication between the computer 10 and another computer within the network. A hub, a splitter switch or a router (not shown) may be connected between the modem 19 and the access-prevention device 11 in order to connect a plurality of computers to a network via the modem 19. In an alternative embodiment, the modem 19 is contained within the chassis 18 of the computer 10. The modem 19 process bi-directional communication by the computer 10 with another computer within the network The computer 10 includes a given port 22 for connection to a network and a bus 23 connected to the given port 22 by an interface 24 for bi-directional communication by the computer 10 with another computer within the network.

The access-prevention device 11 is connected in series with the bus 23 and the given port 22 for preventing the computer 10 from receiving and/or transmitting any communications from and/or to another computer within the network; and the control device 12 is adapted for selectively controlling the access-prevention device 11. Although the access-prevention device 11 is shown as connected in series between the given port 22 of the computer 10 and the modem 19, in an alternative embodiment, the access-prevention device 11 is connected in series between the modem 19 and the external network-access terminal 20.

Figure 2:
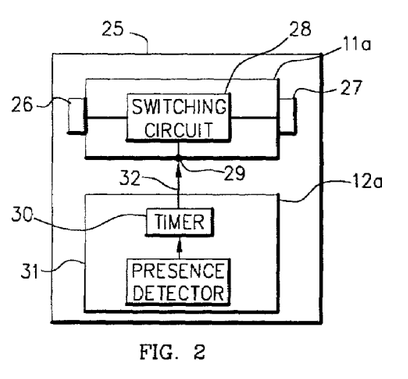
FIG. 2 is a block diagram of one embodiment of an apparatus for controlling communication-access between a computer network and either a computer or a modem. Such apparatus is one embodiment of the combination of the access-prevention device and the control device shown in FIG. 1.

In one embodiment, as shown in FIG. 2, an access-prevention device 11a and a control device 12a are included in an apparatus 25 for controlling communication-access between a network and either a computer or a modem. The apparatus 25 is adapted for series connection in the system of FIG. 1 between the computer port 22 and the modem 19.

The access-prevention device 11a includes a first connector 26 for connection to the given port 22 of the computer 10, a second connector 27 for connection to the network, an electrically powered switching circuit 28 connected in series between the first connector 26 and the second connector 27, and a control terminal 29. The switching circuit 28 is operable in response to a given control signal for preventing receipt by the first connector 26 of any network communications from the second connector 27 and/or for preventing receipt by the second connector 27 of any network communications from the first connector 26. The control terminal 29 is connected to the switching circuit 28 for providing a given control signal to the switching circuit 28 from an external source.

The first and second connectors 26, 27 include Ethernet-cable connectors, universal-service-bus (USB) connectors, coaxial-cable connectors and/or telephone-line-cord connectors. The switching circuit 28 includes one or two solid-state-electronic switches respectively connected to the pins of the first and second connectors 26, 27 that transmit and/or receive network communications between the network and the given port 22 of the computer 10. USB connectors can be used to provide electrical power to the switching circuit 28.

The control device 12a includes a presence detector 30 and a timer 31. The presence detector 30 senses whether or not an operator is present within a predetermined space adjacent the computer. The timer 31 is coupled to the presence detector 30 for measuring each interval when an operator is not present within the predetermined space and provides a given control signal 32 to the control terminal 29 of the access-prevention device 11a whenever the measured interval exceeds a predetermined duration.

The switching circuit 28 of the access-prevention device 11a is automatically controlled in response to the given control signal 32 to prevent the first connector 26 from receiving any network communications from the second connector 27 and/or to prevent the second connector 27 from receiving any network communications from the first connector 26.

Figure 3:
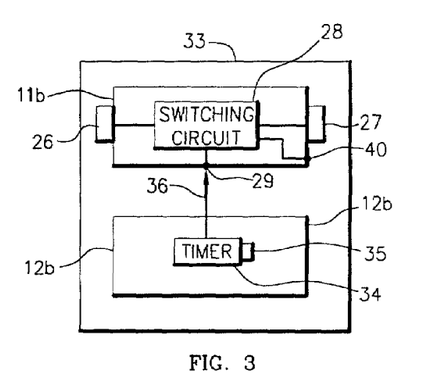
FIG. 3 is a block diagram of another embodiment of an apparatus of the general type shown in FIG. 2. Such apparatus is another embodiment of the combination of the access-prevention device and the control device shown in FIG. 1.

In another embodiment, as shown in FIG. 3, an access-prevention device 11b and a control device 12b are included in an apparatus 33 for controlling communication-access between a network and either a computer or a modem. The apparatus 33 is adapted for series connection in the system of FIG. 1 between the computer port 22 and the modem 19. The access-prevention device 11b is embodied in the same manner as the access-prevention device 11a described above in relation to FIG. 2, except that the access-prevention device 11b further includes a power terminal 40. The power terminal 40 is connected to the switching circuit 28 for providing electrical power to the switching circuit 28 from an external source.

The control device 12b includes a timer 34. The timer 34 includes a manual control knob for selecting a predetermined duration, a manual push button 35 for actuating the timer 34, a clock for measuring an interval beginning upon actuation of the timer 34. The timer 34 provides a given control signal 36 to the control terminal 29 of the access-prevention device 11b whenever the measured interval exceeds the predetermined duration;

The switching circuit 31 of the access-prevention device 11b in the apparatus 33 is automatically controlled in response to the given control signal 36 to prevent the first connector 26 from receiving any network communications from the second connector 27 and/or to prevent the second connector 27 from receiving any network communications from the first connector 26.

Figure 4A:
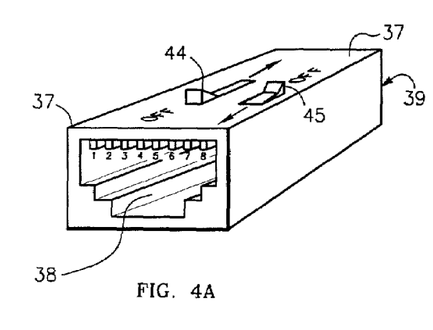
FIG. 4A is a perspective view of still another embodiment of an apparatus of the general type shown in FIG. 2. Such apparatus is still another embodiment of the combination of the access-prevention device and the control device shown in FIG. 1.
Figure 4B:
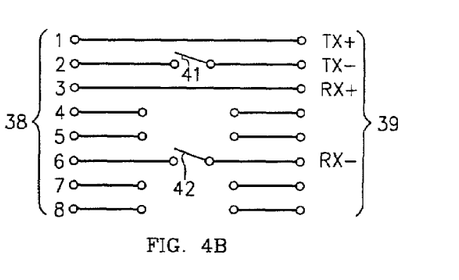
FIG. 4B is a schematic circuit diagram of the apparatus of FIG. 4A.

In still another embodiment, the access-prevention device and the control device are included in an apparatus 37 for controlling communication-access between a network and either a computer or a modem that has an Ethernet-cable port for bi-directional communication by the computer or the modem with the network, such as shown in FIGS. 4A and 4B. The apparatus 37 is adapted for series connection in the system of FIG. 1 between the computer port 22 and the modem 19.

The access-prevention device of the apparatus 37 includes a first Ethernet-cable connector 38 for connection to the Ethernet-cable port, a second Ethernet-cable connector 39 for connection to the network, and a pair of switches 41, 42 connected in series between the first connector 38 and the second connector 39. The control device includes a pair of toggles 44, 45 mechanically linked to the pair of switches 41, 42 for selectively and manually controlling the respective switches 41, 42.

The first connector 38 is either an RJ-45 receptacle, as shown or an RJ-45 plug; and the second connector 39 (obscured from view) is either an RJ-45 receptacle or an RJ-45 plug. Each connector 38, 39 includes eight pins numbered 1 through 8. In accordance the straight-through RJ-45 specification, pins 1 and 2 are used for transmission (TX) of communications and pins 3 and 6 are used for reception (RX) of communications. Alternatively the inter-relation of respective pins of the first and second connectors 38, 39 may be in accordance with either the crossover or rolled RJ-45 specifications.

One switch 41 is connected between the cable pins 6 of the first and second connectors 38, 39 for preventing receipt by the first connector 38 of any network communications from the second connector 39; and the other switch 42 is connected between the cable pins 2 of the first and second connectors 38, 39 for preventing receipt by the second connector 39 of any network communications from the first connector 38. By manually operating the toggles 44 and/or 45, one can selectively prevent the first connector 38 from receiving any network communications from the second connector 39 and/or selectively prevent the second connector 39 from receiving any network communications from the first connector 38.

In alternative embodiments, the apparatus 37 is modified so that a switch is connected between only the cable pins 2 of the first and second connectors 38, 39 or so that a switch is connected between only the cable pins 6 of the first and second connectors 38, 39; and/or the first and second connectors 38, 39 include USB connectors, and/or telephone-line-cord connectors.

Figure 5:
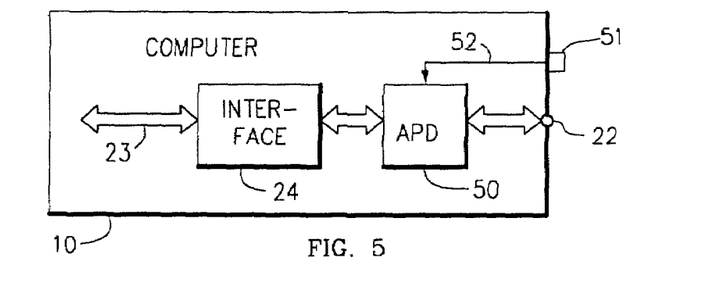
FIG. 5 is a block diagram of an embodiment of a modified portion of the system of FIG. 1, wherein the access-prevention device is disposed within the computer chassis and the control device is disposed on the computer chassis.

In an alternative embodiment of a system for controlling communication-access within a computer network, the system of FIG. 1 is modified as shown in part in FIG. 5 by disposing an access-prevention device (APD) 50 within the computer chassis 18 between the interface 24 and the port 22. Preferably the access-prevention device 50 includes one or two solid-state-electronic switches respectively connected to the pins of the port 22 that transmit and/or receive network communications between the bus 23 and the port 22. These switches are selectively controlled by operation of a control device 51 disposed on the computer chassis 18. The control device 51 includes a number of control buttons corresponding to the number of switches in the access-prevention device 50 for providing control signal(s) 52 to selectively trigger the operation of the switch(es) in response to depression of the control button(s), to thereby selectively prevent the computer 10 from receiving and/or transmitting any communications from and/or to another computer within the network. The switch(es) in the access-prevention device 50 are switched between open and closed positions in response to successive control signal(s) 52 from the control device 51. In an alternative embodiment the switches in the access-prevention device 50 are mechanical switches that are mechanically linked to a toggle in the control device 51.

Figure 6:
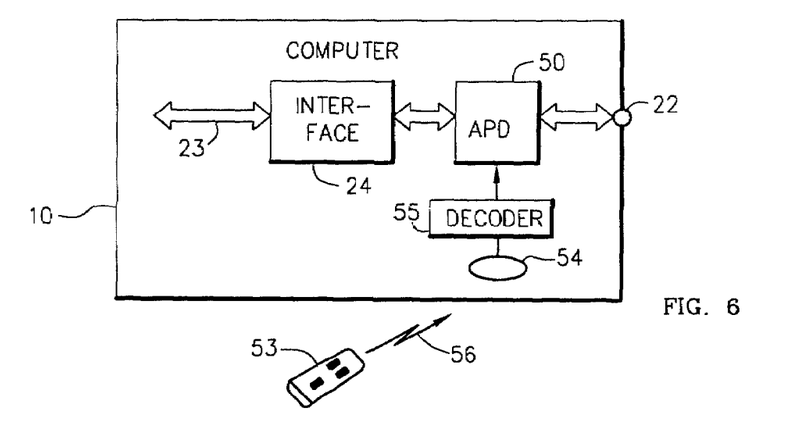
FIG. 6 is a block diagram of an embodiment of a modified portion of the system of FIG. 1, wherein the access-prevention device is disposed within the computer chassis and the control device includes a remote-control device.

In another alternative embodiment, the system of FIG. 1 is modified as shown in FIG. 6, wherein an access-prevention device 50 including one or two solid state switches is disposed within the computer chassis 18 between the interface 24 and the port 22, as described above with reference to FIG. 5. This embodiment differs from the embodiment of FIG. 5 in that the control device includes a combination of a remote-control device 53; an infrared detector 54 and an infrared signal decoder 55 connected to the solid-state switch(es) of the access-prevention device 50. The remote-control device 53 includes a number of control buttons corresponding to the number of switches in the access-prevention device 50 for causing transmission by the remote-control device 53 of a corresponding number of unique infrared control signals 56 that can be detected by the infrared detector 54 and decoded by the decoder 55 to selectively trigger the opening of the switch(es) in response to depression of the control button(s), to thereby selectively prevent the computer 10 from receiving and/or transmitting any communications from and/or to another computer within the network. The remote-control device 53 also includes a reset button for causing transmission by the remote-control device of an infrared reset signal that can be detected by the infrared detector 54 and decoded by the decoder 55 to trigger the closing of any open switches in response to depression of the reset button.

Figure 7:
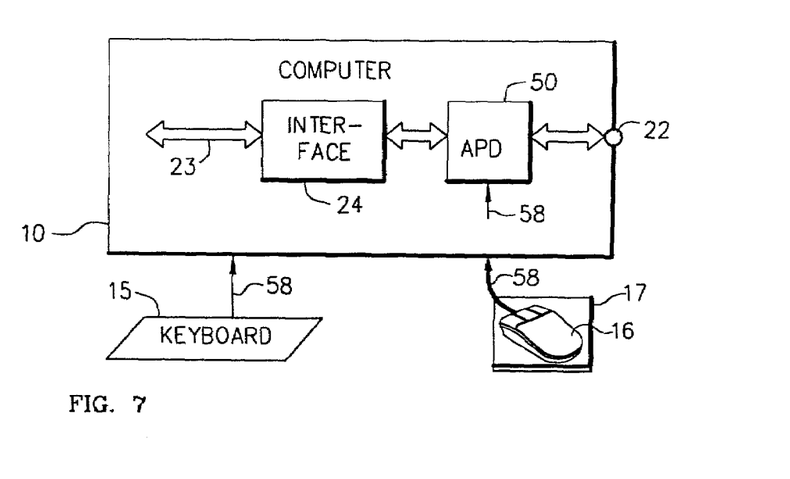
FIG. 7 is a block diagram of an embodiment of a modified portion of the system of FIG. 1, wherein the access-prevention device is disposed within the computer chassis and the control device includes a computer keyboard or mouse.

In a further alternative embodiment, the system of FIG. 1 is modified as shown in FIG. 7, wherein an access-prevention device 50 including one or two solid state switches is disposed within the computer chassis 18 between the interface 24 and the port 22, as described above with reference to FIG. 5. This embodiment differs from the embodiment of FIG. 5 in that the control device includes the keyboard 15 and/or the mouse 16. Selective operation of the keyboard 15 and/or the mouse 16 provides one or more control signals 58 for selectively triggering the opening of the switch(es) in the access-prevention device 50 in response to such selective operation, to thereby selectively prevent the computer 10 from receiving and/or transmitting any communications from and/or to another computer within the network. Further operation of the keyboard or the mouse provides a reset signal to trigger the closing of all of any open switches.

Figure 8:
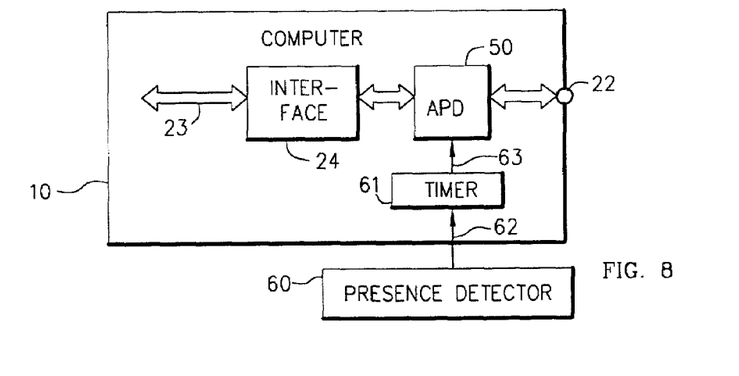
FIG. 8 is a block diagram of an embodiment of a modified portion of the system of FIG. 1, wherein the access-prevention device is disposed within the computer chassis and the control device includes a presence detector.

In still another alternative embodiment, the system of FIG. 1 is modified as shown in FIG. 8, wherein an access-prevention device 50 including one or two solid state switches is disposed within the computer chassis 18 between the interface 24 and the port 22, as described above with reference to FIG. 5. This embodiment differs from the embodiment of FIG. 5 in that the control device includes a presence detector 60 and a timer 61 implemented by the computer 10 in accordance with a software routine. The presence detector 60 senses whether or not an operator is present within a predetermined space adjacent the computer 10 and provides a corresponding binary presence-detection signal 62 to the timer 61. The timer 61 responds to the presence-detection signal 62 by measuring each interval when an operator is not present within the predetermined space and provides a given control signal 63 to trigger the opening of the switch(es) in the access-prevention device 50 whenever the measured interval exceeds a predetermined duration to thereby selectively prevent the computer 10 from receiving and/or transmitting any communications from and/or to another computer within the network. When the presence-detection signal 62 next indicates that the operator is present within the predetermined space, the timer 61 responds thereto by providing a reset signal to trigger the closing of the switch(es) in the access-prevention device 50.

Figure 9:
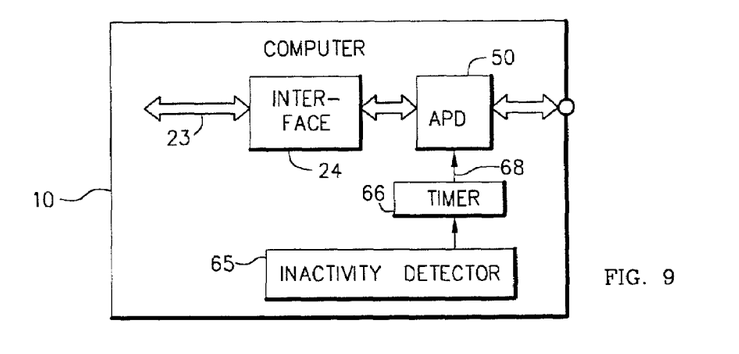
FIG. 9 is a block diagram of an embodiment of a modified portion of the system of FIG. 1, wherein the access-prevention device is disposed within the computer chassis and the control device includes an inactivity detector.

In still a further embodiment, the system of FIG. 1 is modified as shown in FIG. 9, wherein an access-prevention device 50 including one or two solid state switches is disposed within the computer chassis 18 between the interface 24 and the port 22, as described above with reference to FIG. 5. This embodiment differs from the embodiment of FIG. 5 in that the control device includes an inactivity detector 65, and a timer 66 which are implemented by the computer 10 in accordance with software routines. The inactivity detector 65 detects inactivity when the computer 10 is not performing a routine in response to an input received from an input device, such as the keyboard 15 and the mouse 16. The timer 66 measures each detected interval of inactivity, and provides a given control signal 68 to trigger the opening of the switch(es) in the access-prevention device 50 whenever the measured interval exceeds a predetermined duration to thereby selectively prevent the computer 10 from receiving and/or transmitting any communications from and/or to another computer within the network. When the inactivity detector 65 ceases to detect such inactivity, a reset signal is provided to trigger the closing of the switch(es) in the access-prevention device 50.

Figure 10:
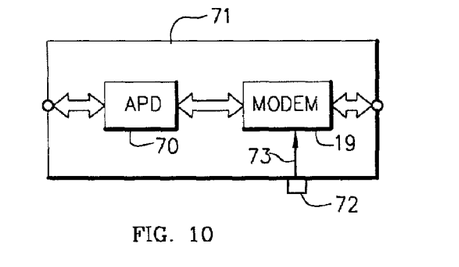
FIG. 10 is a block diagram of an embodiment of a modified portion of the system of FIG. 1, wherein the access-prevention device is disposed within the modem chassis and the control device is disposed on the modem chassis.

In another alternative embodiment of a system for controlling communication-access within a computer network, the system of FIG. 1 is modified as shown in part in FIG. 10 by disposing an access-prevention device (APD) 70 within the chassis 71 of the modem 19. Preferably the access-prevention device 70 includes one or two solid-state-electronic switches respectively connected to the pins of the modem 19 that transmit and/or receive network communications between the modem 19 and the port 22 of the computer 10. Alternatively, the switches are respectively connected to the pins of the modem 19 that transmit and/or receive network communications between the modem 19 and the external network-access terminal 20. These switches are selectively controlled by operation of a control device 72 disposed on the modem chassis 71. The control device 72 includes a number of control buttons corresponding to the number of switches in the access-prevention device 70 for providing control signal(s) 73 to selectively trigger the operation of the switch(es) in response to depression of the control button(s), to thereby selectively prevent the computer 10 from receiving and/or transmitting any communications from and/or to another computer within the network. The switches in the access-prevention device 70 are switched between open and closed positions in response to successive control signal(s) 73 from the control device 72. In an alternative embodiment the switch(es) in the access-prevention device 70 are mechanical switches that are mechanically linked to a toggle in the control device 72.

Figure 11:
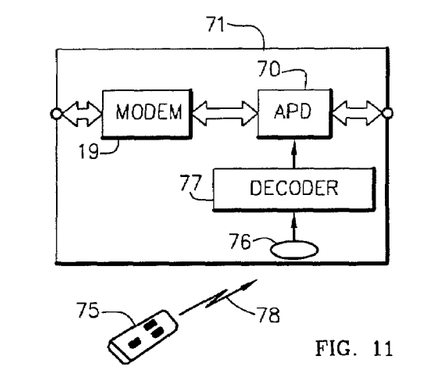
FIG. 11 is a block diagram of an embodiment of a modified portion of the system of FIG. 1, wherein the access-prevention device is disposed within the modem chassis and the control device includes a remote-control device.

In a further alternative embodiment, the system of FIG. 1 is modified as shown in FIG. 11, wherein an access-prevention device 70 including one or two solid state switches is disposed within the modem chassis 71, as described above with reference to FIG. 10. This embodiment differs from the embodiment of FIG. 10 in that the control device includes a combination of a remote-control device 75; an infrared detector 76 and an infrared signal decoder 77 connected to the solid-state switch(es) of the access-prevention device 70. The remote-control device 75 includes a number of control buttons corresponding to the number of switches in the access-prevention device 70 for causing transmission by the remote-control device 75 of a corresponding number of unique infrared control signals 78 that can be detected by the infrared detector 76 and decoded by the decoder 77 to selectively trigger the opening of the switch(es) in response to depression of the control button(s), to thereby selectively prevent the computer 10 from receiving and/or transmitting any communications from and/or to another computer within the network. The remote-control device 75 also includes a reset button for causing transmission by the remote-control device of an infrared reset signal that can be detected by the infrared detector 76 and decoded by the decoder 77 to trigger the closing of any open switches in response to depression of the reset button.

Figure 12:
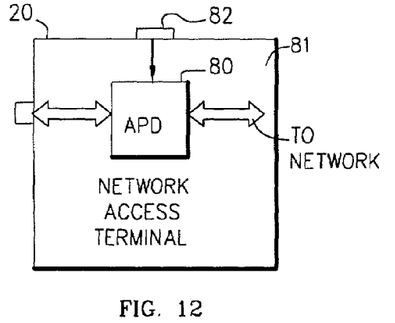
FIG. 12 is a block diagram of an embodiment of a modified portion of the system of FIG. 1, wherein the access-prevention device is disposed within the external network-access-terminal chassis and the control device is disposed on the external network-access-terminal chassis.

In another alternative embodiment of a system for controlling communication-access within a computer network, the system of FIG. 1 is modified as shown in part in FIG. 12 by disposing an access-prevention device (APD) 80 within the chassis 81 of the external network-access terminal 20. Preferably the access-prevention device 80 includes one or two solid-state-electronic switches respectively connected to the pins of the external network-access terminal 20 that transmit and/or receive network communications between the external network-access terminal 20 and the port 22 of the computer 10. These switches are selectively controlled by operation of a control device 82 disposed on the network-access terminal chassis 81. The control device 82 includes a number of control buttons corresponding to the number of switches in the access-prevention device 80 for providing control signal(s) 83 to selectively trigger the operation of the switch(es) in response to depression of the control button(s), to thereby selectively prevent the computer 10 from receiving and/or transmitting any communications from and/or to another computer within the network. The switches in the access-prevention device 80 are switched between open and closed positions in response to successive control signal(s) 83 from the control device 82. In an alternative embodiment the switch(es) in the access-prevention device 80 are mechanical switches that are mechanically linked to a toggle in the control device 82.

Figure 13:
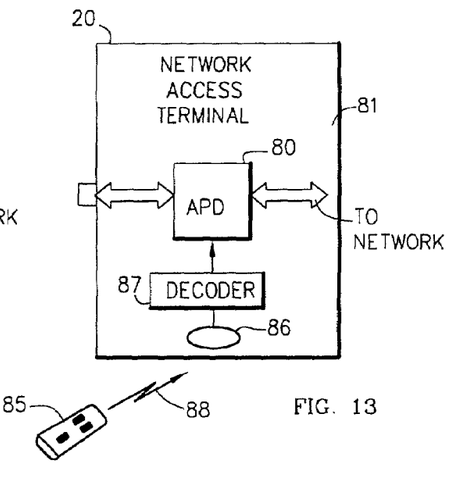
FIG. 13 is a block diagram of an embodiment of a modified portion of the system of FIG. 1, wherein the access-prevention device is disposed within the external network-access-terminal chassis and the control device includes a remote-control device.

In a further alternative embodiment, the system of FIG. 1 is modified as shown in FIG. 13, wherein an access-prevention device 80 including one or two solid state switches is disposed within the external network-access terminal chassis 81, as described above with reference to FIG. 12. This embodiment differs from the embodiment of FIG. 12 in that the control device includes a combination of a remote-control device 85; an infrared detector 86 and an infrared signal decoder 87 connected to the solid-state switch(es) of the access-prevention device 80. The remote-control device 85 includes a number of control buttons corresponding to the number of switches in the access-prevention device 80 for causing transmission by the remote-control device 85 of a corresponding number of unique infrared control signals 88 that can be detected by the infrared detector 86 and decoded by the decoder 87 to selectively trigger the opening of the switch(es) in response to depression of the control button(s), to thereby selectively prevent the computer 10 from receiving and/or transmitting any communications from and/or to another computer within the network. The remote-control device 85 also includes a reset button for causing transmission by the remote-control device of an infrared reset signal that can be detected by the infrared detector 86 and decoded by the decoder 87 to trigger the closing of any open switches in response to depression of the reset button.

Figure 14:
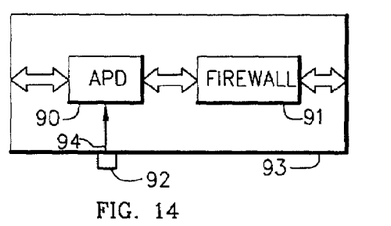
FIG. 14 is a block diagram of an embodiment of a modified portion of the system of FIG. 1, wherein the access-prevention device is integrated with a firewall device the and the control device is disposed on the firewall-device chassis.

In another alternative embodiment of a system for controlling communication-access within a computer network, the system of FIG. 1 is modified as shown in part in FIG. 14 by integrating an access-prevention device (APD) 90 with a firewall device 91. Preferably the access-prevention device 90 includes one or two solid-state-electronic switches respectively connected to the pins of the firewall device 91 that transmit and/or receive network communications between the firewall device 91 and the port 22 of the computer 10. These switches are selectively controlled by operation of a control device 92 disposed on the chassis 93 of a firewall device 91 that is external to the computer chassis 18, or disposed on the computer chassis 18 when the firewall device is installed within the computer chassis 18. The control device 92 includes a number of control buttons corresponding to the number of switches in the access-prevention device 90 for providing control signal(s) 94 to selectively trigger the operation of the switch(es) in response to depression of the control button(s), to thereby selectively prevent the computer 10 from receiving and/or transmitting any communications from and/or to another computer within the network. The switches in the access-prevention device 90 are switched between open and closed positions in response to successive control signal(s) 94 from the control device 92. In an alternative embodiment the switch(es) in the access-prevention device 90 are mechanical switches that are mechanically linked to a toggle in the control device 92.

Figure 15:
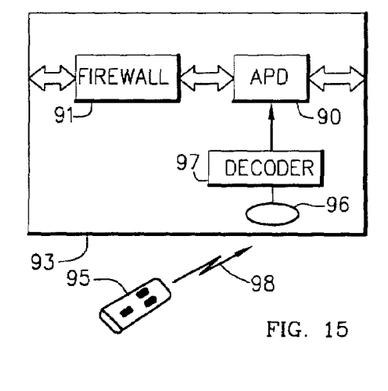
FIG. 15 is a block diagram of an embodiment of a modified portion of the system of FIG. 1, wherein the access-prevention device is integrated with a firewall device and the control device includes a remote-control device.

In a further alternative embodiment, the system of FIG. 1 is modified as shown in FIG. 15, wherein an access-prevention device 90 including one or two solid state switches is integrated with the firewall device 91, as described above with reference to FIG. 14. This embodiment differs from the embodiment of FIG. 14 in that the control device includes a combination of a remote-control device 95; an infrared detector 96 and an infrared signal decoder 97 connected to the solid-state switch(es) of the access-prevention device 90. The remote-control device 95 includes a number of control buttons corresponding to the number of switches in the access-prevention device 90 for causing transmission by the remote-control device 95 of a corresponding number of unique infrared control signals 98 that can be detected by the infrared detector 96 and decoded by the decoder 97 to selectively trigger the opening of the switch(es) in response to depression of the control button(s), to thereby selectively prevent the computer 10 from receiving and/or transmitting any communications from and/or to another computer within the network. The remote-control device 95 also includes a reset button for causing transmission by the remote-control device of an infrared reset signal that can be detected by the infrared detector 96 and decoded by the decoder 97 to trigger the closing of any open switches in response to depression of the reset button.

Figure 16:
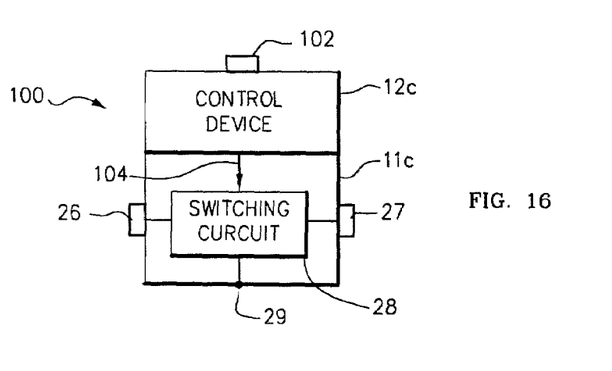
FIG. 16 is a block diagram of still another embodiment of an apparatus for controlling communication-access between a computer network and either a computer or a modem. Such apparatus is still another embodiment of the combination of the access-prevention device and the control device shown in FIG. 1.

In still another embodiment, as shown in FIG. 16, an access-prevention device 11*c* and a control device 12*c* are included in an apparatus 100 for controlling communication-access between a network and either a computer or a modem. The apparatus 100 is adapted for series connection in the system of FIG. 1 between the computer port 22 and the modem 19. The access-prevention device 11*c* is embodied in the same manner as the access-prevention device 11*a* described above in relation to FIG. 2.

The control device 12*c* includes a push button 102 and is manually actuated by operation of the push button 102 to provide a given control signal 104 that causes the switching means 28 to prevent the first connector 26 from receiving any network communications from the second connector 27 and/or to prevent the second connector 27 from receiving any network communications from the first connector 26.

The apparatus 100 also includes an internal power supply, such as a battery (not shown) for providing electrical power to the switching circuit 28 and the control device 12c. Alternatively, the apparatus includes a power terminal (not shown) that is connected for providing electrical power to the switching circuit 28 and the control device 12c from an external source; or one of the first and second connectors 26, 27 is a USB connector through which electrical power is provided to the switching circuit 28 and the control device 12c.

The apparatus 100 is particularly versatile in that it 100 can be operated manually by using the control button 102 or automatically when an accessory device that automatically provides the given control signal in response to some predetermined occurrence is connected to the control terminal 29 of the access-prevention device 11c. An example of such a predetermined occurrence is a given measured interval exceeding a predetermined duration. Examples of such an accessory device are the control device 12a of the apparatus 25 shown in FIG. 2, and the control device 12b of the apparatus 33 shown in FIG. 3. When an accessory device is connected to the control terminal 29, the control device 12c is inoperable in response to use of the push button 102.

In some of the embodiments in which the control device includes a remote control device, Bluetooth technology is used instead of infrared-transmission technology.

In other embodiments (not shown) various individual features of the different embodiments described herein are combined with one another.

The various individual features of the different embodiments described herein do not necessarily apply to every conceivable embodiment of the present invention. Further, any stated advantages of the present invention should not be construed as the only advantages of the present invention.

While the above description contains many specificities, these should not be construed as limitations on the scope of the present invention, but rather as examples of the embodiments described herein. Other variations are possible and the scope of the present invention should be determined not by the embodiments described herein but rather by the claims and their legal equivalents.

We claim:

1. An access-prevention device for controlling communication-access between a computer network and either a computer or a modem that has a given port for bi-directional communication by the computer or the modem with the network, the access-prevention device consisting of
   a first connector for connection to the given port,
   a second connector for connection to the network,
   hardware-implemented electrically powered switching means connected in series between the first and second connectors and operable in response to a given control signal for preventing receipt by the first connector of any network communications from the second connector and/or for preventing receipt by the second connector of any network communications from the first connector, and
   a control terminal connected to the switching means for providing said given control signal to the switching means from an external source.

2. The access-prevention device according to claim 1 in combination with manually actuated means for providing said given control signal to the switching means.

3. The access-prevention device according to claim 1 in combination with a power terminal connected to the switching means for providing electrical power to the switching means from an external source.

4. The access-prevention device according to claim 1 in combination with a control device connected to the control terminal for automatically controlling the switching means of the access-prevention device in response to a given measured interval exceeding a predetermined duration to prevent the first connector from receiving any network communications from the second connector and/or to prevent the second connector from receiving any network communications from the first connector.

5. The combination of the access-prevention device and the control device according to claim 4, wherein the control device comprises:
   sensing means for sensing whether or not an operator is present within a predetermined space adjacent the computer; and
   means coupled to the sensing means for measuring each interval when an operator is not present within said predetermined space and for providing said given control signal to the control terminal whenever the measured interval exceeds a predetermined duration;
   wherein said automatic control of the access-prevention device is in response to said given control signal.

6. The combination of the access-prevention device and the control device according to claim 4, wherein the control device comprises:
   a timer, including means for selecting a predetermined duration, means for measuring an interval beginning upon actuation of the timer and means for providing said given control signal to the control terminal whenever the measured interval exceeds the predetermined duration;
   wherein said automatic control of the access-prevention device is in response to said given control signal.

7. The access-prevention device according to claim 1, wherein the switching means is connected only for preventing the first connector from receiving any network communication from the second connector.

8. The access-prevention device according to claim 1, wherein the switching means is connected only for preventing the second connector from receiving any network communication from the first connector.

9. The access-prevention device according to claim 1, wherein the switching means is connected for preventing any network communication between the first connector and the second connector.

10. An access-prevention device for controlling communication-access between a computer network and either a computer or a modem that has a given port for bi-directional communication by the computer or the modem with the network, the access-prevention device consisting of
    a first connector for connection to the given port,
    a second connector for connection to the network, and
    hardware-implemented switching means connected in series between the first and second connectors for preventing receipt by the first connector of any network communications from the second connector and/or for preventing receipt by the second connector of any network communications from the first connector.

11. A combination of an access-prevention device and a control device for controlling communication-access within a computer network to a given computer that has a given port for bi-directional communication by the given computer with another computer within the network, said combination comprising:
    an access-prevention device connected in series with the given port for preventing the given computer from receiving and/or transmitting any communications from and/or to said another computer within the network; and a control device for controlling the access-prevention device;

wherein the access-prevention device consists of a first connector for connection to the given port, a second connector for connection to the network, hardware-implemented electrically powered switching means connected in series between the first and second connectors and operable in response to a given control signal for preventing receipt by the first connector of any network communications from the second connector and/or for preventing receipt by the second connector of any network communications from the first connector, and a control terminal connected to the switching means for providing said given control signal to the switching means from the control device; and wherein the access-prevention device is disposed within a chassis that contains the given computer.

12. The combination of the access-prevention device and the control device according to claim 11, wherein the control device is disposed on said chassis.

13. The combination of the access-prevention device and the control device according to claim 11, further comprising a keyboard connected to the given computer for controlling operation of the given computer;

wherein the control device includes the keyboard.

14. The combination of the access-prevention device and the control device according to claim 11, further comprising a mouse connected to the given computer for controlling operation of the given computer;

wherein the control device includes the mouse.

15. The combination of the access-prevention device and the control device according to claim 11, wherein the control device comprises a manually operable wireless remote-control device for transmitting said given control signal; and wherein the access-prevention device is controlled in response to said given control signal.

16. The combination of the access-prevention device and the control device according to claim 11, wherein the control device comprises:

sensing means for sensing whether or not an operator is present within a predetermined space adjacent the given computer; and means coupled to the sensing means for measuring each interval when an operator is not present within said predetermined space and for providing a given control signal whenever the measured interval exceeds a predetermined duration;

wherein said automatic control of the access-prevention device is in response to said given control signal.

17. The combination of the access-prevention device and the control device according to claim 11, wherein the control device comprises:

means for measuring each interval when the given computer is not performing a routine in response to an input received from an input device connected directly to the given computer and for providing a given control signal whenever the measured interval exceeds a predetermined duration;

wherein said control of the access-prevention device is in response to said given control signal.

18. Within a computer network that includes a given computer having a given port for bi-directional communication by the given computer with another computer within the network, and a modem connected to the given port for processing said bi-directional communication by the given computer with said another computer within the network, a combination of an access-prevention device and a control device for controlling communication-access between the given computer and said another computer, the combination comprising:

an access-prevention device connected in series with the given port and the modem for preventing the given computer from receiving and/or transmitting any communications from and/or to said another computer within the network; and a control device for controlling the access-prevention device;

wherein the access-prevention device consists of a first connector for connection to the given port, a second connector for connection to the network, hardware-implemented electrically powered switching means connected in series between the first and second connectors and operable in response to a given control signal for preventing receipt by the first connector of any network communications from the second connector and/or for preventing receipt by the second connector of any network communications from the first connector, and a control terminal connected to the switching means for providing said given control signal to the switching means from the control device; and wherein the access-prevention device is disposed within a chassis that contains the modem.

19. The combination of the access-prevention device and the control device according to claim 18, wherein the control device is disposed on the chassis that contains the modem.

20. The combination of the access-prevention device and the control device according to claim 18, wherein the control device comprises a manually operable wireless remote-control device for transmitting a given control signal; and wherein said control of the access-prevention device is in response to said given control signal.

21. Within a computer network that includes a given computer having a given port for bi-directional communication by the given computer with another computer within the network, and an external network-access terminal connected in series with the given port for enabling said bi-directional communication by the given computer with another computer within the network, a combination of an access-prevention device and a control device for controlling communication-access between the given computer and said another computer, the combination comprising:

an access-prevention device connected in series with the given port and the external network-access terminal for preventing the given computer from receiving and/or transmitting any communications from and/or to said another computer within the network; and a control device for controlling the access-prevention device;

wherein the access-prevention device consists of a first connector for connection to the given port, a second connector for connection to the network, hardware-implemented electrically powered switching means connected in series between the first and second connectors and operable in response to a given control signal for preventing receipt by the first connector of any network communications from the second connector and/or for preventing receipt by the second connector of any network communications from the first connector, and a control terminal connected to the switching means for providing said given control signal to the switching means from the control device; and wherein the access-prevention device is disposed within a housing that contains the external network-access terminal.

22. The combination of the access-prevention device and the control device according to claim 21, wherein the control device is disposed on the housing that contains the external network-access terminal.

23. The combination of the access-prevention device and the control device according to claim 21, wherein the control device comprises a manually operable wireless remote-control device for transmitting a given control signal; and wherein said control of the access-prevention device is in response to said given control signal.

24. Within a computer network that includes a given computer having a given port for bi-directional communication by the given computer with another computer within the network, and an external firewall device connected to the given port for providing firewall protection for the given computer, a combination of an access-prevention device and a control device for controlling communication-access between the given computer and said another computer, the combination comprising:

an access-prevention device connected in series with the given port and the external firewall device for preventing the given computer from receiving and/or transmitting any communications from and/or to said another computer within the network; and a control device for controlling the access-prevention device;

wherein the access-prevention device consists of a first connector for connection to the given port, a second connector for connection to the network, hardware-implemented electrically powered switching means connected in series between the first and second connectors and operable in response to a given control signal for preventing receipt by the first connector of any network communications from the second connector and/or for preventing receipt by the second connector of any network communications from the first connector, and a control terminal connected to the switching means for providing said given control signal to the switching means from the control device; and wherein the access-prevention device is disposed within a housing that contains the external firewall device.

25. The combination of the access-prevention device and the control device according to claim 24, wherein the control device is disposed on the housing that contains the external firewall device.

26. The combination of the access-prevention device and the control device according to claim 24, wherein the control device comprises a manually operable wireless remote-control device for transmitting said given control signal; and wherein said control of the access-prevention device is in response to said given control signal.

* * * * *